United States Patent [19]

Charter

[11] Patent Number: 4,625,548
[45] Date of Patent: Dec. 2, 1986

[54] HYDROSTATIC HEAD PRESSURE SENSORS FOR A SYSTEM TO DETERMINE FLUID LEVEL AND WEIGHT

[75] Inventor: Ian G. Charter, Seabrook, Tex.

[73] Assignee: Dresser Industries, Inc., Dallas, Tex.

[21] Appl. No.: 722,554

[22] Filed: Apr. 12, 1985

[51] Int. Cl.$^4$ .............. G01F 23/16; G01L 7/08; G01N 9/26

[52] U.S. Cl. .................. 73/299; 73/438; 73/302; 73/715

[58] Field of Search ........... 73/299, 300, 302, 438, 73/701, 714, 715, 706; 384/112, 123, 99; 137/859

[56] References Cited

U.S. PATENT DOCUMENTS

| | | | |
|---|---|---|---|
| 1,596,774 | 8/1926 | Star | 73/302 |
| 2,369,707 | 2/1945 | Baak | 73/715 |
| 2,722,123 | 11/1955 | Kangas | 73/216 |
| 2,749,744 | 6/1956 | Doudera et al. | 73/715 |
| 2,841,984 | 7/1958 | Green | 73/706 |
| 3,038,336 | 6/1962 | Peters | 73/438 |
| 3,161,051 | 12/1964 | Perry, Jr. | 73/299 |
| 3,365,949 | 1/1968 | Robinson | 73/715 |
| 3,388,598 | 6/1968 | Hall | 73/715 |
| 3,563,094 | 2/1971 | Rieschel | 73/715 |
| 3,572,121 | 3/1971 | Kesseru et al. | 73/302 |
| 4,043,193 | 8/1977 | Bailey | 73/302 |
| 4,111,047 | 9/1978 | Bailey | 73/302 |
| 4,136,567 | 1/1979 | Rosenblum | 73/438 |
| 4,193,303 | 3/1980 | Egnell | 73/299 |
| 4,307,609 | 12/1981 | Rosenblum | 73/438 |
| 4,517,842 | 5/1985 | Twomey et al. | 73/701 |

FOREIGN PATENT DOCUMENTS 0666960 7/1963 Canada .................. 73/715

Primary Examiner—Charles Frankfort
Assistant Examiner—Thomas B. Will
Attorney, Agent, or Firm—Richard M. Byron

[57] ABSTRACT

A hydraulic liquid pressure sensor for use in a gas operated pressure sensor system includes a sensor body with a generally circular membrane resting surface, an inlet connected to a peripheral portion of the surface and an outlet opening from a central location on the surface. A flexible membrane is positioned adjacent to the resting surface and in flush contact therewith when not in use. The flexible membrane is secured and sealed around the periphery of the circular membrane resting surface. The inlet includes an annular groove in the pressure sensor body and spaced around substantially outward of the outlet opening. The inlet also includes an additional groove in the sensor body opening to the resting surface, connected to the annular inlet groove and extending inwardly therefrom.

15 Claims, 9 Drawing Figures

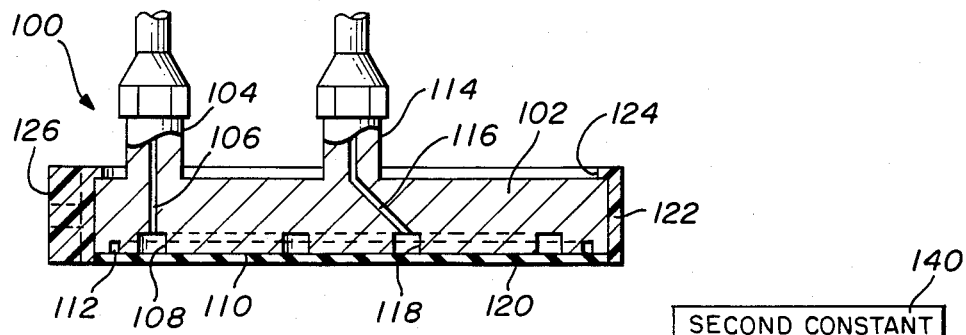
FIG. 6
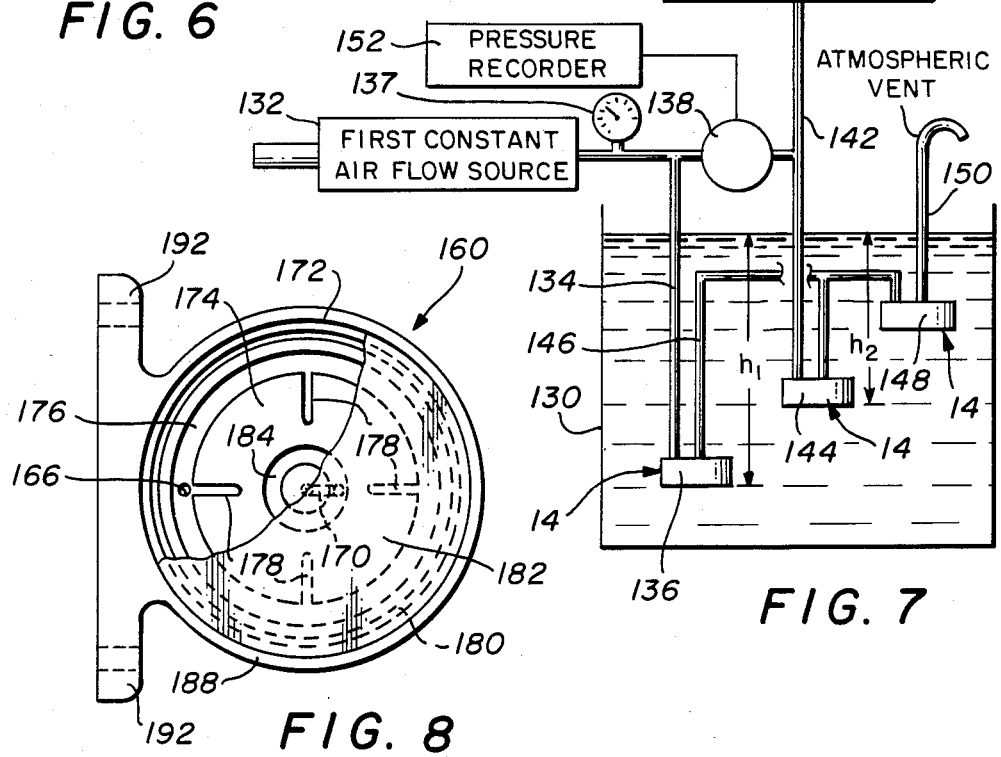
FIG. 7
FIG. 8
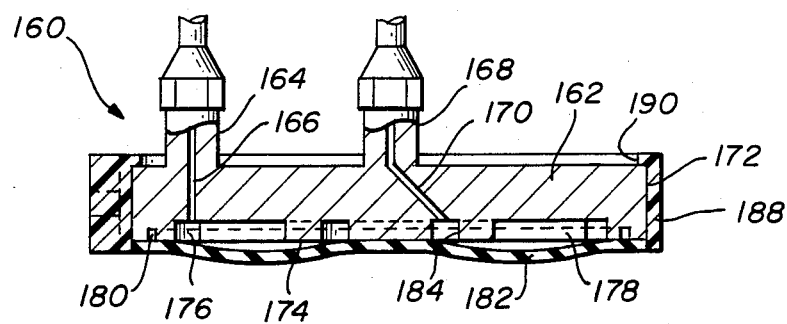
FIG. 9

HYDROSTATIC HEAD PRESSURE SENSORS FOR A SYSTEM TO DETERMINE FLUID LEVEL AND WEIGHT

TECHNICAL FIELD

This invention is related to submersible pressure sensors wherein fluid pressure acting over a membrane is transmitted to an opposing gas pressure in the sensor that is monitored so that the pressure within a liquid at the location of the pressure sensor can be determined. More specifically, this invention is related to pressure sensors for use in oilwell drilling fluid, handling and storage containers and in conjunction with operating systems that monitor the depth and density of drilling fluid in such a container.

BACKGROUND OF THE INVENTION

This invention is related to hydrostatic fluid pressure and density measuring and monitoring sensors and systems for placement within the confines of a fluid medium such as liquid in a tank to measure the liquid depth and density within the tank at the location of the measuring device or sensor. The specific pressure sensor of this invention is in the category of pressure sensors that use a constant gas flow through the sensor device and relates the pressure of this gas flow to hydrostatic pressure of liquid at the level of the pressure sensor in the tank or container of liquid.

The broad basic sensing technique of measuring hydrostatic pressures at different depths in a liquid to determine depth and density has been used for many years and it provides a quite accurate measurement. This technique is usable to measure hydrostatic pressure in a liquid or in a gas. In using this measurement technique several constructions of specific pressure sensor devices have been built for use in specific applications. Depending upon the specific environment in which the pressure sensor must exist and operate the construction of the sensor device will vary considerably.

The specific application of this invention is measuring the hydrostatic pressure within a container of drilling fluid or mud of the character used with rotary drilling of oil and gas wells. The mud is basically a mixture of barite, water and other stabilizing elements. A feature of the drilling mud that renders it somewhat difficult to deal with is that it is thixotropic by necessity so that it will support suspended particles of cuttings once the circulation in an earth borehole has stopped. This feature of the drilling mud causes it to cake quite readily when its motion is stopped. This caking will take place not only in the earth borehole while being drilled but also in the tanks, containers, etc. for mixing and storing the drilling mud at the earth surface. This caking is accelerated when the mud is exposed to air and it begins to dry.

The pressure sensor of this invention is designed to be located in a drilling mud tank above the earth surface with the pressure sensor mounted in a fixed location in the tank. Because of the caking problem, any pressure sensor that is placed in such service will necessarily require periodic cleaning or removal of the mud cake so that it will operate properly and provide data within acceptable limits of accuracy. Because of the necessity for periodic cleaning the structure of this pressure sensor device must be quite rugged in order to withstand its sensing element being brushed, scraped or otherwise wiped clean of the cake material. In a drilling mud storage tank the uppermost pressure sensor would be located at a sufficient depth so as to remain submerged as the fluid level varies.

When these pressure sensors require cleaning they would need to be cleaned rather quickly so that drilling operations can proceed as a continuous twenty-four hour operation. The pressure sensors in such a tank would be raised to a point slightly above the surface of the fluid thus enabling a person to reach them. With the sensors raised a person can reach into the tank with a longhandled brush or scraping device to clean caked mud from the operative part of each sensor. It is to be expected that such cleaning would not normally be done in a particularly careful and sensitive manner and thus the pressure sensor structures must necessarily be quite rugged in their construction.

One such sensor known to be usable for this type environment is described in U.S. Pat. No. 4,111,047. This sensor construction has a pair of elongated flexible elastomeric membranes that lie in flush contact with each other so that gas can flow between them from one end of the sensor to the other while both pieces are surrounded by the liquid being tested. Pressure acting on the exterior of these flexible elastomeric members transmits liquid pressure in the container to the pressure in the gas. Such a construction is quite susceptible to physical damage when being cleaned due to the unsupported nature of the two members. Another embodiment shown in this patent replaces one of the flexible elastomeric members with a thin flexible metal member. This construction will be slightly more rugged but will however be subject to damage if the relatively thin metal member is bent or deformed by cleaning or handling.

Another construction known to be used in this type of pressure sensor has a pair of elastomeric membranes with one securely attached to a flat rectangularly shaped side of a support member and a second membrane positioned over the first membrane and sealed around the facing peripheral edge portions with no outer peripheral or edge protection. In this construction ports for gas communication between the membranes are located in a spaced relation on the support member and open through the first membrane that is securely attached to this support member. This permits flow from one port to the other between facing portions of the membranes in the limited area between the two ports. This construction while more rugged than the first described would still be vulnerable to damage if the bond between the membranes were to be exposed to the brush or scraping device during cleaning operations. In the event the flexible elastomeric membranes became unbonded this failure would necessitate replacement of the pressure sensor creating an inconvenience and expense in restoring this portion of the drilling mud handling system to its proper operation.

Further it is known that sensors designed to include facing flexible elastomeric members may fail in use if the constant gas flow between the membranes is temporarily interrupted while the sensor remains immersed in the fluid. This failure results from the facing membrane surfaces adhering to one another as a result of the now unopposed external hydrostatic pressure forcing the facing membrane surfaces into contact.

Pressure sensors in the category that use a constant gas flow through the sensor device and relate the pressure of this gas flow to the hydrostatic pressure of liquid at the level of the pressure sensor in the tank or container of liquid rely for their ability to operate with precision upon the degree with which the gas flow is maintained constant. Pressure sensors in this category known to be used in the applications described exhibit a relationship between the pressure of the gas and the flow rate of the gas. Extreme precautions are taken to maintain the gas flow rate at a fixed level.

SUMMARY OF THE INVENTION

In an embodiment, a hydraulic fluid pressure sensor includes a rigid sensor body having a generally circular membrane resting surface with a gas inlet communicating to an outer peripheral annular portion of the resting surface and a gas outlet communicating from a central opening in the resting surface. A flexible membrane lies with one side against the resting surface covering both the inlet groove and the outlet opening. A protective support is mounted around the sensor body for protecting the device and mounting it within a tank or to a supporting structure. Inlet and outlet conduit joining fixtures are provided to connect the sensor in a conduit system.

Another embodiment of the pressure sensor is constructed generally similar to the first and has an annular inlet groove in the resting surface around its periphery and a plurality of radially inwardly directed connecting grooves extending toward the centrally disposed outlet opening. The radially disposed groove structure provides a more dispersed generally radially oriented flow of gas between the resting surface and the membrane. Further the radially disposed groove structure reduces the restriction to the gas flow at the annular inlet port between the radially inner shoulder of the inlet annulus and the space separating the flexible membrane and the rigid body of the sensor.

Yet, another embodiment of the pressure sensor structure of this invention is constructed generally similar to the first described embodiment and additionally has an annular outlet. This annular outlet has an annular groove formed in the resting surface generally concentric with the inlet groove and positioned in spaced relation thereto. This outlet groove is connected by a passageway to the sensor gas outlet conduit joining fixture.

One further embodiment of this invention is a pressure sensor construction combining a resting surface with the radially inwardly directed grooves and the annular inlet groove with feature of an annular outlet groove located in the central portion of the resting surface spaced from inner ends of the radially directed grooves.

One object of this invention is to overcome the aforementioned disadvantages of the prior art devices.

Another object of this invention is to provide a hydrostatic pressure sensor device for use in a relatively shallow tank or container of drilling mud to provide a very accurate measurement of the hydrostatic pressure at a particular depth location and which will withstand the physical abuse inherent with operation of such a device in the drilling rig oilfield environment.

Yet, another object of this invention is to provide one embodiment of a hydrostatic fluid pressure sensor with a generally circular membrane resting surface extending substantially across the whole sensor body over which the constant volume source of gas will flow from an annular peripheral location to a centrally disposed location thereby providing uniform dispersion of the gas over an area that is covered with a flexible membrane member. This dispersion of the gas in a uniform and radially symmetrical pattern over a circular area is important regarding the accuracy of pressure measurements taken in the liquid due to its effects on shaping of the membrane and its response to transmitting the pressures involved.

Yet, a further object of this invention is to provide another embodiment of the pressure sensor of this invention with an annular inlet groove around an outer peripheral portion of a membrane resting surface with a plurality of interconnecting geometrically radially disposed grooves in said resting surface directed from the annular inlet groove toward the centrally disposed outlet opening. These radially disposed grooves terminate in a spaced relation to the outlet opening and provide a dispersing of gas from the inlet such that the flow at the outlet opening is both radial in direction and distributed in magnitude evenly among all the directions of radial flow.

An additional object of this invention is to provide another embodiment of the pressure sensor of this invention similar to the one first described yet being provided with an annular outlet groove in the resting surface as well as the annular inlet groove. This annular outlet groove is concentrically disposed with respect to the annular inlet groove and spaced therefrom.

Yet, another object of this invention is to provide a hydrostatic pressure sensor device for use in a drilling mud storage tank or the like that is sufficiently rugged so it can be easily cleaned by a brush, scraper, or similar cleaning instrument with little risk of being damaged by the cleaning operation.

A further object of this invention is to provide a hydrostatic pressure sensor device for use in a drilling mud storage tank or the like that relates the pressure in the gas flow through the sensor to hydrostatic fluid pressure at the level of the pressure sensor in a manner that is less dependent upon the magnitude of the flow rate when compared with sensors known to be used in the applications described.

Various other objects, advantages and features of this invention will become apparent to those skilled in the art from the following discussion, taken in conjunction with the accompanying drawings, in which:

DESCRIPTION OF THE DRAWINGS

FIG. 3 is a top plan view of the pressure sensor shown in FIG. 2;

FIG. 6 is a partially cutaway view taken in transverse section of a third embodiment of the pressure sensor of this invention having both annular inlet and annular outlet grooves in the resting surface and shown with the membrane in a non-operating position;

FIG. 7 is a pictorial view of a drilling mud tank having two of the pressure sensors of this invention mounted therein and connected together and operably connected to separate respective constant flow air sources in a well known arrangement suitable for measuring the density of mud in the tank;

FIG. 8 is a bottom plan view of a fourth embodiment of the pressure sensor of this invention having a plurality of radially placed grooves in the resting surface connected to the annular inlet groove and an annular outlet groove with a portion of the membrane cutaway exposing the resting surface; and FIG. 9 is a transverse partially cross-sectional view of the fourth embodiment of this invention shown in FIG. 8 with the membrane shown in an operating position.

Figure 1:
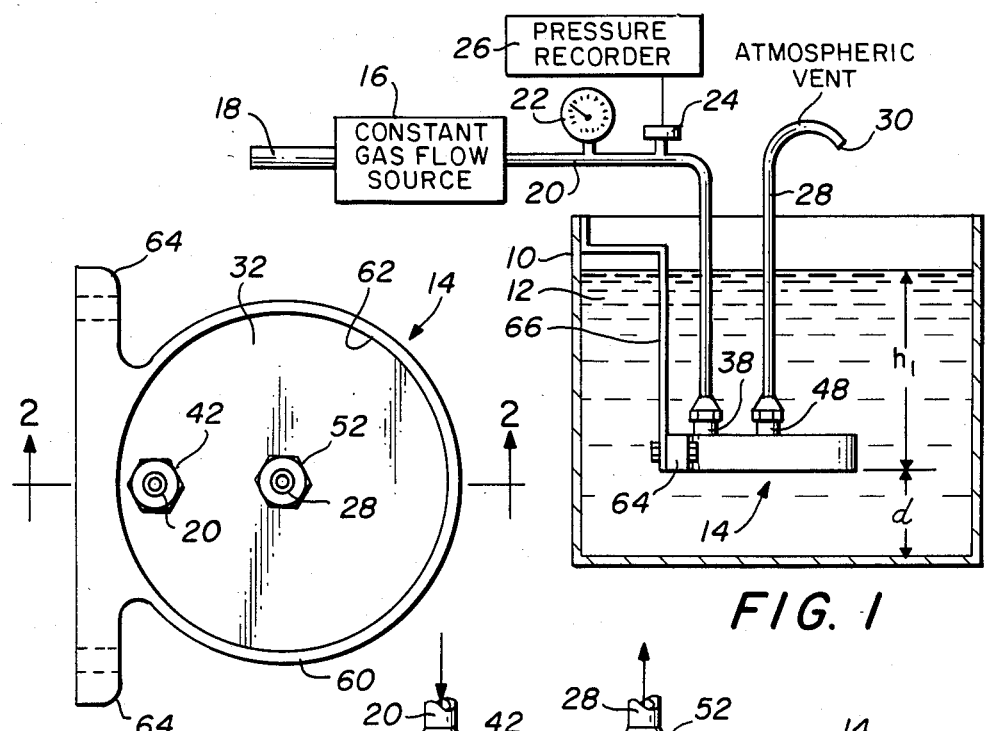
FIG. 1 is a pictorial view of a drilling mud tank having the sensor of this invention installed therein and connected to a gas flow source, pressure monitoring equipment and an atmospheric vent located outside of the tank in an arrangement for measuring the liquid level.

The following is a discussion and description of preferred specific embodiments of the hydrostatic head pressure sensor of this invention, such being made with reference to the drawings, whereupon the same reference numerals are used to indicate the same or similar parts and/or structure. It is to be understood that such discussion and description is not to unduly limit the scope of the invention.

DETAILED DESCRIPTION OF THE PREFERRED EMBODIMENT

Referring to FIG. 1, such shows the hydrostatic pressure sensor of this invention incorporated into a system for measuring the hydrostatic pressure of drilling mud in an open top tank. Drilling mud tank 10 contains a quantity of drilling mud or drilling fluid 12 that fills the tank to a level above the hydrostatic head pressure sensor that is indicated generally at 14. Pressure sensor 14 has its bottom positioned a distance d above the tank bottom and a distance h below the surface of drilling mud in the tank. The gas supply for pressure sensor 14 includes a constant gas flow rate air source 16 having a gas inlet 18 and connected to a gas source conduit 20 that is in fluid communication with an inlet to pressure sensor 14. The gas supply for this system can be any suitable gas source that provides either air, nitrogen, helium or some other gas to the constant gas flow source for regulated introduction into the measuring system. Air is chosen as the supply gas in the following description however it is to be understood that any of the noted gases will function as an equivalent. Air source conduit 20 is provided with a gauge 22 to monitor the pressure of gas coming from constant air flow source 16. Also, connected in conduit 20 is an electronic pressure sensor or transducer 24 that is connected to a pressure recorder 26 operable to record pressures in conduit 20 at selected times or continuously depending upon the choice of the user. The outlet from pressure sensor 14 is connected to an outlet or vent conduit 28 that is in fluid communication at an outlet opening 30 to the atmosphere thereby providing an atmospheric pressure return for the air leaving hydrostatic head pressure sensor 14.

In the event that it is desired to operate the hydrostatic pressure sensor system shown in FIG. 1 in a closed top tank or other vessel with pressurized gas above the liquid then pressure sensor 14 can be used with equal results. In this application the gas pressure above the liquid would have to be considered as affecting the system. Pressure at pressure transducer 24 would have to be a differential measurement with respect to gas pressure above the liquid in order to indicate the proper depth. In this modification flow of gas from vent outlet 30 would remain open to the atmosphere outside of the closed tank.

Figure 2:
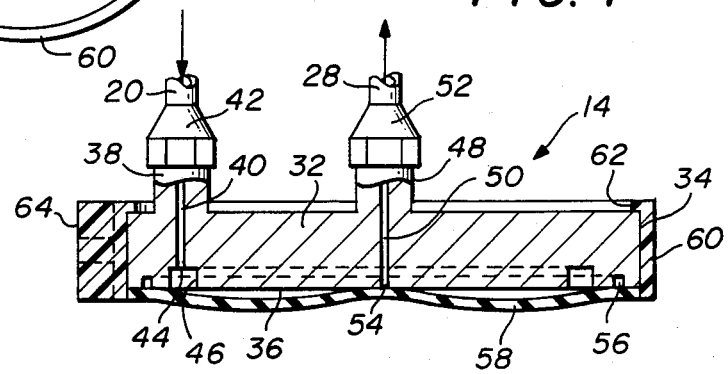
FIG. 2 is a transverse partially cross-sectional view of one embodiment of the pressure sensor of this invention having an annular inlet groove and a centrally disposed outlet and with the membrane thereof shown in its normal operating position.
Figure 4:
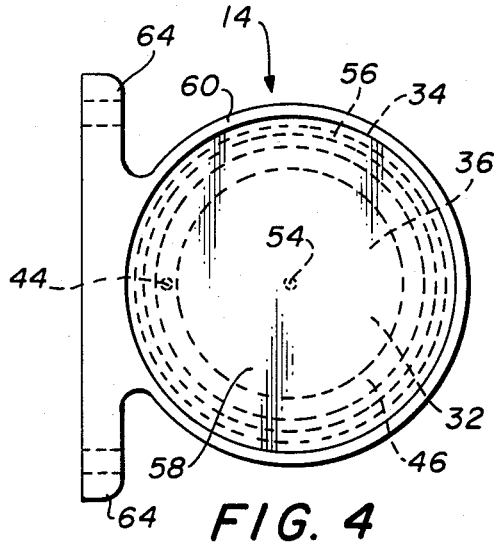
FIG. 4 is a bottom plan view of the pressure sensor shown in FIG. 2.

Referring to FIGS. 2, 3 and 4, such shows one embodiment (1) of hydrostatic head pressure sensor 14 of this invention a sectional view exposing the interior thereof with the inlet and outlet connected to the respective conduits 20 and 28. This specific embodiment (1) of the pressure sensor is indicated at 14 to distinguish it from the following described other two embodiments of pressure sensors because of structural differences in the resting surface for the pressure responsive membrane and associated gas inlets and outlets.

Pressure sensor 14 includes a body 32 with a cylindrical outer surface 34 and a flat membrane resting surface 36 on the bottom side thereof. On the upper side portion of body 32 an inlet fixture 38 has been located relative to a cylindrical outer surface 34. Inlet fixture 38 contains an inlet passageway 40 opening on its upper end to conduit 20 within a fluid coupling 42 and terminating at an outlet opening 44 within the closed end portion of an annular inlet groove 46. Annular inlet groove 46 is located around the outer peripheral portion of resting surface 36 and positioned generally concentricly thereon as shown in FIGS. 2 and 4. Pressure sensor body 32 is preferably constructed of a substantially rigid material that is chemically and mechanically unaffected by the harsh drilling mud materials. Resting surface 36 is a substantially flat surface extending across the lower surface of pressure sensor body 32 and being the surface upon which the pressure sensor's membrane will temporarily rest when in a non operating condition and submerged in a liquid such as drilling mud. This resting surface 36 is also the surface that functions as a reference plane for displacement of the flexible membrane as described below.

An outlet fixture 48 is located on the upper portion of body 32 and includes an outlet passage 50 therethrough and extending through body 32. Outlet passage 50 is in fluid communication with outlet or vent conduit 28 joining this conduit at a fluid coupling 52 on outlet fixture 48. The lower end of outlet passage 50 forms the inlet to this passage and such includes an opening 54 centrally located in resting surface 36.

Membrane resting surface 36 is substantially flat and formed over the lower surface of body 32 in a circular shape. Resting surface 36 includes an outermost or second annular groove 56 radially spaced outward of annular inlet groove 46 and radially inward of cylindrical outer body surface 34. This second annular groove 56 functions to trap excess bonding material used in attaching the flexible membrane 58 to the outer peripheral portion of resting surface 36. In addition to trapping any excess bonding material this groove also provides a circumferentially disposed limit of flexibility for the membrane 58 so that portions of it lying radially inward of groove 56 can be considered as flexible while portions of it lying radially outside the groove can be considered as attached and sealed. Annular inlet groove 46 is spaced radially inward of second groove 56 and positioned concentrically with respect to outlet opening 54 so that a substantially circular resting surface is provided on which membrane 58 can rest when in a resting or non displaced position.

Flexible membrane 58 is a parallel sided sheet of flexible material that in an undistorted condition lies with one side in flush contact with membrane resting surface 36. Flexible membrane 58 is preferably constructed of an elastomeric type material of sufficient thickness to withstand abuse of the rather harsh environment of the drilling mud holding tank described above. Flexible membrane 58 is preferably constructed of a material that is very flexible and can be deformed by a relatively low volume gas flow between the inlet and outlet passages across resting surface 36 without significantly restraining this gas flow. This material must be sufficiently flexible in order to allow hydrostatic liquid pressure acting on the exposed side of the membrane to transmit its force through the membrane into the associated gas flow without unduly restricting the transmission of these forces.

Flexible membrane 58 must be constructed of a material that is sufficiently impervious to gas or air flow and the presence of drilling mud such that it will not absorb or pass either of these fluids but maintain them physically separated. The material from which membrane 58 is made must meet these criteria and additionally have a thermal coefficient of expansion that is compatible with the coefficient of expansion of body member 32. Ideally the coefficient of expansion of body member 32 and membrane 58 would be the same. However, if such ideally suitable materials are not available then reasonable compatibility will suffice. Where different coefficients of expansion are involved it is preferable that expansion of body member 32 exceed the expansion of membrane 58. This is a preferable arrangement because if there is a reduction in the diameter of the body relative to the membrane it would cause the membrane to balloon away from the body and disrupt the symmetrical radial flow of the gas and in turn the pressure-force relationship of the system.

An additional consideration in the selection of the materials for use in the construction of the body member 32 and the flexible membrane 58 is the susceptibility of the materials to adhesion at their facing surfaces when the gas flow between the surfaces is temporarily interrupted and hydrostatic pressure continues to be applied to the lower surface of the membrane 58. Under such circumstances the facing surfaces come into contact but must not adhere. Adherence between the surfaces will, when gas flow is resumed, disrupt the geometry of the space between the surfaces such that the required force relationship across the membrane is not achieved. The materials from which body member 32 and flexible member 58 are preferably made is a combination of materials that will not adhere in the absence of a bonding material placed on these materials for the purpose of bonding them together.

Pressure sensor body 32 is partially enclosed in a mount assembly that protects the sensor and provides a mount structure for securing it in a mud holding tank or the like. This mount includes a support ring portion 60 encircling the cylindrical exterior side of sensor body 32 and having a radially inwardly directed lip 62 overlying the sensor body's top side around the periphery thereof. This mount assembly includes a pair of flanges 64 extending in a tangental fashion from the mounts support ring portion 60 in opposite directions as shown in FIGS. 3 and 4. Each of the flanges has an aperature therethrough for a fastener or bolt to secure the mount to a supporting structure. In FIG. 1 the sensor mount is shown attached to a mounting frame 66 located in drilling mud tank 10.

Sensor body 32 is shown as being cylindrical on its outer side 34, however that physical construction is not strictly necessary. If desired sensor body 32 could be rectangular or some other shape on its outer sides and it would function similarly. In such a rectangular construction the body's perimeter would be rectangular and the resting surface 36, inlet groove 46 and other groove 56 would be circular as shown.

Referring to FIG. 2, the sensor is shown with membrane 58 in the normally operably deformed shape. When the sensor is submerged and not operating membrane 58 will lie flush against resting surface 36. When the sensor is not operating, not submerged and held in the position shown then membrane 58 will sag slightly and be displaced downward in an arc like shape from resting surface 36.

Figure 5:
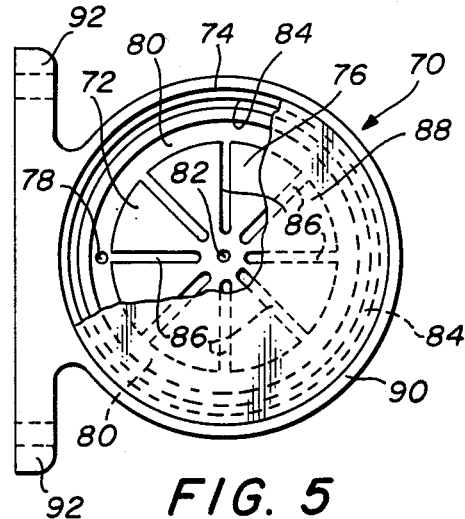
FIG. 5 is a bottom plan view of a second embodiment of the pressure sensor of this invention having a plurality of radially placed grooves in the resting surface and connected to the annular inlet groove and with the membrane cutaway exposing the resting surface.

FIG. 5 illustrates another embodiment, (2), of the hydrostatic head pressure sensor of this invention, indicated generally at 70. This embodiment, (2), of this invention differs from the first described embodiment, (1), in the areas of the construction of the inlet passageways and the grooved construction of the resting surface for the flexible membrane.

In this embodiment, (2), a sensor body 72 is constructed very similar to that described above with an inlet, an outlet, a cylindrical exterior surface 74, and a resting surface 76 on its bottom surface. Sensor body 72 has a substantially flat membrane resting surface 76 on its lower surface extending there across and bounded by outer surface 74. The upper portion of sensor body 72 (not shown) is provided with inlet and outlet fixtures and passageways similar to those in FIGS. 2 and 3 for connection with gas conduits and the like. The gas inlet has a passageway that terminates in an opening 78 lying within an annular groove 80. Annular groove 80 is formed in sensor body 72 around the peripheral portion of resting surface 76. The gas outlet has a passageway through body 72 terminating at an opening 82 located in the center portion of resting surface 76. Outlet opening 82 is centrally disposed relative to annular inlet groove 80. A second and smaller annular groove is provided in resting surface 76 at a location spaced radially outward of annular inlet groove 80. This second annular groove 84 provides a reservoir to collect excess bonding material and to provide a clean line of attachment of the flexible membrane with sensor body 72.

A plurality of radially disposed inlet grooves 86 are provided in resting surface 76 and connected to the inner side of annular inlet groove 80. These radially disposed grooves 86 extend toward outlet opening 82 and terminate a spaced distance therefrom as shown clearly in FIG. 5. Radially disposed grooves 86 are positioned in a substantially uniform and circumferentially spaced relationship to each other and terminate in a similar uniform spaced relation to outlet opening 82. FIG. 5 depicts a quantity of eight (8) such radially disposed grooves 86 as exemplifying one arrangement of the inlet groove construction of this invention. It is to be understood that both larger and smaller numbers of these grooves could be used at the designed option of the user. The arrangement of radially disposed grooves provides for an even distribution of radially inwardly flowing gas between resting surface 76 and the flexible membrane 88 in a manner introducing minimal restriction to the flow at the radially inner shoulder of the annular inlet groove 80.

Flexible membrane 88 is constructed of a sheet of parallel sided flexible elastomeric material the same as that described above so that it will lie flat on resting surface 76 when submerged and be displaceable by the low volume gas flow in order to transmit pressure from the surrounding liquid to the gas during normal operation. Pressure sensor body 72 is enclosed within a protective mount assembly for structural protection and support when in use. This mount includes a support ring portion 90 around the periphery of the sensors outer body surface 74 and overlapping on its upper portion as shown in FIG. 3. The supporting structure of this mount includes a pair of flanges 92 extending from mount ring 90 in a tangental fashion in opposite directions as shown to provide for physical support of the pressure sensor.

FIG. 6 illustrates yet another embodiment, (3), of the hydrostatic head pressure sensor of this invention, which is indicated generally at 100. This embodiment of the pressure sensor of this invention is constructed similar to the first described embodiment thereof but differs in the construction of the outlet passageway at the flexible membrane resting surface.

In this embodiment, (3), the sensor body is constructed similar to that described above with inlet and outlet fixtures and associated passageways communicating to a resting surface over which a flexible membrane is positioned. Sensor body 102 is provided with an inlet fixture 104 connectable to an inlet conduit and containing an inlet passageway 106 through the body terminating at an annular inlet groove 108 around the periphery portion of resting surface 110. A second annular groove 112 is provided in the sensor body opening to resting surface 110 and located radially outward of inlet groove 108 to act as a reservoir for excess bonding material.

The pressure sensor outlet includes an outlet fixture 114 that is connectable with an outlet conduit and contains an outlet passageway 116. Outlet passageway 116 extends through pressure sensor body 102 and communicates with an annular outlet passageway groove 118. Outlet annular groove 118 is formed in pressure sensor body 102 opening to resting surface 110 as shown in FIG. 6. Outlet annular groove 118 is positioned in a centrally disposed location with respect to inlet annular groove 108. Inlet annular groove 108 and outlet annular groove 118 are spaced substantially apart so when the sensor is submerged in liquid and not operating flexible membrane 120 will reside on resting surface 110 in an annular segment of the surface between these grooves and on the circular segment within the interior of outlet annular groove 118. When the pressure sensor is in operation flexible membrane 120 can be displaced from resting surface 110 causing the gas flow to be substantially radially inwardly directed between inlet groove 108 and outlet groove 118.

Pressure sensor body 102 is partially enclosed in a mount assembly that protects the sensor and provides a mount structure for securing the sensor in a mud holding tank or the like. This mount assembly is constructed similar to those described above and includes a support ring portion 122 encircling the cylindrical exterior portion of sensor body 102 and having a radially inwardly directed lip 124 over the upper peripheral portion of the sensor body as illustrated. A flange assembly 126 includes a pair of flanges located on tangentially opposite sides of the sensor body. These flanges are provided for mounting of the device to a supporting structure. The mount assembly of this embodiment is the same as that shown in FIGS. 3 and 4 in conjunction with the first described embodiment of the pressure sensor.

FIGS. 8 and 9 illustrate yet another embodiment, (4), of the hydrostatic head pressure sensor of this invention. This embodiment of the head pressure sensor is indicated generally at 160. This embodiment, (4), of this invention differs from the previously described embodiments in the areas of construction of the inlet and outlet passageways and the grooved construction on the membrane resting surface.

In this embodiment, (4), the sensor body 162 is constructed similar to that described above with respect to the inlet and outlet fixtures, and the overall sensor mounting. Sensor body 162 has an inlet fixture 164 and associated passageway 166 and an outlet fixture 168 with an associated outlet passageway 170. Sensor body 162 has a cylindrical exterior surface 172 with a flat membrane resting surface 174 extending across its bottom surface. Inlet passageway 166 connects with annular inlet groove 176 formed in body member 162 and opening to membrane resting surface 174. A plurality of radially disposed inlet grooves 178 are provided in resting surface 174 and connected to the inner side of annular inlet groove 176. These radially disposed grooves 178 extend toward a center portion of the resting surface terminating in a spaced relation to the outlet opening. These radially disposed grooves 178 are positioned in a substantially uniform and circumferentially spaced relationship to each other as shown in FIG. 8. A quantity of four (4) of such radially disposed grooves are shown to exemplify one arrangement of the inlet groove construction of this embodiment. It is to be understood that larger and smaller numbers of these grooves could be used at the desired option of the user.

Another annular groove 180 is provided around the outer periphery portion of resting surface 174. This other annular groove 180 is radially spaced outward of annular inlet groove 176 and functions as a reservoir to collect excess bonding material used in attaching the flexible membrane 182 to body 162 around the peripheral portion of resting surface 174.

The outlet for this embodiment of the invention includes an outlet annular groove 184 opening to resting surface 174 and located in concentric relation to annular inlet groove 176 and spaced inward of the intermost ends of radially disposed grooves 178 as illustrated. Outlet passageway 170 connects with annular outlet groove 184 as shown in FIG. 9.

Pressure sensor body 162 is partially enclosed in a mount assembly that protects the sensor and provides a mount structure for securing the sensor in a mud holding tank or the like. This mount assembly is constructed similar to those described above including a support ring portion 188 encircling the cylindrical exterior portion of sensor body 162. A radially inwardly directed lip 190 is located over an upper peripheral portion of the sensor body as illustrated in FIG. 9. The bottom of mount support ring 188 terminates at the lower exposed surface of flexible membrane 182. Flanges 192 are located on tangentially opposite sides of mount support ring 188 as shown in FIG. 8 for mounting the sensor to a supporting structure.

On the sensor of this embodiment, (4), as shown in FIGS. 8 and 9 is in operation fluid pressure acting on flexible membrane 182 as opposed by the gas under pressure as it moves from the sensors inlet to the sensors outlet. This causes flexible membrane 182 to be displaced to a shape approximately the exaggerated shape shown in FIG. 9 with the center portion of the membrane resting upon the central circular segment of the resting surface and outer portions of the membrane displaced from this resting surface under the influence of the gas flow. The arrangement of radially disposed grooves and circular inlet and outlet grooves provides for an even distribution of the radially inwardly directed gas flow between the sensor body, its resting surface 174 and flexible membrane 182 in a manner that introduces minimal restriction to the flow of gas at the radially inner shoulder of annular inlet groove 176 and at the outer shoulder of annular outlet groove 184. Because of the pressure force relationships involved with this type of measuring device are sensitive to restrictions of the gas flow this particular embodiment minimizes by providing for an even distribution in a mechanical construction as designed to reduce such restrictions.

Referring to FIG. 1 that shows pressure sensor 14 connected in a measuring system with the pressure sensor submerged in a container of liquid. This illustrates one use of the pressure sensor of this invention. With the system as shown connected to a single pressure sensor it can function to determine the total depth of liquid in the container. In this instance the container is a tank or the like containing drilling mud. This tank can be a bulk storage tank for drilling mud or a processing container for drilling mud such as the "possum belly" in the mud handling system of a rotary drilling rig.

Measuring the pressure at a selected location in a liquid container for the purpose of determining depth of liquid and the container is well known in the art. In this procedure the following equation is followed:

$$P = \rho \times g \times h$$

where:
P equals the measured pressure at the pressure sensor,
$\rho$ is the density of the liquid,
g is the gravitational acceleration, and
h is the distance from the point where the measurement is taken to the surface of liquid.

In this formula the density for the selected liquid and the gravitational acceleration are known and as the pressure is measured the dimension h can be calculated.

For the system shown in FIGS. 1 and 2 with pressure sensor 14 the constant air flow source provides a substantially constant flow of air at a pressure greater than atmospheric pressure to flow through the pressure sensor inlet passage 40 and around and through inlet groove 46. When the flow of this gas displaces membrane 58 from resting surface 36 it assumes the wave like displaced shape as shown in FIG. 2 allowing the gas to flow radially inward over resting surface 36 and passing into outlet opening 54 in the central portion of the resting surface. Gas flowing toward outlet opening 54 is controlled in its movement into this opening by pressure of the liquid acting on the membrane and this pressure being transferred to the gas through the membrane. Gas flows from the pressure sensor 14 through conduit 28 and is vented to the atmosphere at conduit outlet 30. This provides a pressure determination at pressure sensor 14 that is correlated to the pressure of liquid acting on the bottom surface of membrane 58. This pressure can be monitored at pressure gauge 22 and recorded by pressure recorder 26. The pressure recorder can be a device operable to display and record the actual pressure measured and from that calculate, display, and record the depth of liquid in the tank or a tank volume for a tank of known surface area.

Referring to the well known prior art measuring system shown in FIG. 7 incorporating the pressure transducers 14 of this invention. The system shown in FIG. 7 is assembled and connected to determine the density of liquid in an open top tank 130. Pressure transducers used in this system are preferably any of the pressure sensors of this invention as described above. For purposes of illustration the pressure sensors are each indicated generally as being the first embodiment pressure sensors 14 shown in detail in FIGS. 2, 3 and 4. This system includes a first constant air flow source 132 connected by conduit 134 to the inlet of the lower most pressure sensor indicated at 136 and also to one side of a differential air pressure sensor 138. A pressure gauge 137 is provided at the outlet of first constant air flow source 132 for monitoring air pressure at the inlet side of lowermost pressure sensor 136. A second constant air flow source 140 is connected by conduit 142 to the opposite side of differential pressure transducer 138 and to the inlet of the next higher elevation pressure transducer indicated at 144. The outlets of both pressure transducers 136 and 144 are connected together by conduit 146 to the inlet of a pressure buffer device 148. The outlet of pressure buffer device 148 is connected by conduit 150 to a vent at atmospheric pressure.

It is known in the art of measuring devices that two pressure sensors can be used to determine a differential pressure between two separate vertically displaced locations within a liquid and thus determine the density of the liquid. In this art a simple mathematical relationship is used;

$$P1 - P2 = \rho \times g \times (h_1 - h_2)$$

Where the terms are as follows:
P1 is the pressure measured at the lower most pressure sensor 136,
P2 is the pressure measured at the second or next higher pressure sensor 144, and
$\rho$ is the density of the liquid,
g is the gravitational acceleration,
$h_1$ is the distance between the surface of the liquid and the location at which the pressure measurement is taken at the first or lower most pressure sensor 136, and
$h_2$ is the distance between the surface of the liquid and the location at which the pressure measurement is taken by the second pressure sensor 144.

In this equation the density will be the only unknown term and the differential pressure between P1 and P2 is determined by the differential pressure sensor 138 that can be recorded and used for calculations by pressure recorder 152.

Pressure buffer 148 is placed in the discharge conduit from the pressure sensors at an elevation above the second pressure sensor 144 and at a location that would typically be submerged. This device functions to buffer the outlet pressure from the pressure sensors to an intermediate pressure between the atmospheric pressure and the inlet pressure to the pressure sensors thereby stabilizing the differential pressure relationships of the system.

In using the first and second embodiment pressure sensors of this invention in a simple fluid density measuring system that is functionally equivalent to that shown in FIG. 7 they perform very well. With a vertical spacing ($h_1-h_2$) of 6 inches (15.24 centimeters) between the lower surfaces of the membranes of the pressure sensors and a 6 inch spacing between the lower surface of the membrane of the upper elevation sensor and the buffer membrane a fluid density measurement accuracy of 0.1 pounds per gallon has been obtained in fluids whose densities lie between 8.3 and 23 pounds per gallon. When precautions were taken to ensure that the fluid in the tank was maintained free of motion then a density measurement accuracy of 0.04 pounds per gallon was achieved with this density measuring system. In tests performed to measure the effects of changes in the gas flow rate of one of the two flow sources of the configuration illustrated in FIG. 7 upon the fluid density computed from the differential pressure measurement results indicate that with sensors designed according to this invention or measurement error of 0.24 pounds per gallon is introduced when the gas flow rate through one sensor is increased by 1 cubic foot per hour. When a similar test is performed on sensors in this category already in use in the applications described and arranged in the configuration illustrated in FIG. 7 a measurement error of 0.68 pounds per gallon is introduced when the gas flow rate through one sensor is increased by 1 cubic foot per hour. Because of the high degree of accuracy of these pressure sensors their incorporation into a pressure sensing system for measuring the depth or density of a liquid in a shallow container is quite advantageous and an advancement over prior art systems that required a one foot spacing between the pressure sensors.

When the pressure sensors of the several embodiments of this invention are used in the density measuring system shown in FIG. 7 as each of the pressure sensors 136 and 144 they function as described in detail above. Each pressure sensor will accurately transmit liquid pressure from the liquid medium contained in tank 130 to the gas as it passes through the pressure sensors thereby providing accurate and responsive data to differential pressure sensor 138. It is to be understood that either of the pressure sensors 136 or 144 and the pressure buffer 148 can be any of the above specifically described pressure sensor embodiments of this invention. In using these specific pressure sensors the system shown in FIG. 7 will be improved in its accuracy and performance by the air flow and operating characteristics of these sensor designs.

In the event that the system shown in FIG. 7 is to be used in a closed top tank or other vessel that may have pressurized gas above the liquid then a slight modification to the pressure measurements will be needed. In this situation the atmospheric exhaust or vent should remain in communication with the atmosphere and the pressure sensors of this invention will then perform in the same manner as in an open top tank.

In the use and operation of the several embodiments of the pressure sensor of this invention it has been shown that these devices operate to provide an extremely accurate and precise transmission of fluid pressure from a liquid medium on one side of a flexible membrane to a gas on the opposite side of the membrane for accurately determining the fluid pressure in a liquid container at a specific location. The construction of these pressure sensors is such that they are rugged and are adapted for use in the harsh environment of drilling mud holding and processing tanks. The structures are simple in construction and can be duplicated with relative ease from a manufacturing standpoint. The pressure sensors of this invention provide an advancement in the art of pressure sensors over those used in this environment and service previously due to the sensors construction and the manner in which the flow of gas through the portion of the sensor functions to expose the gas to pressure of the liquid.

Although specific preferred embodiments of this invention have been described in great detail in the preceding specification this description is not intended to limit the scope of the invention to the particular form or embodiments disclosed herein since they are recognized as illustrative of the invention rather than restrictive and it would be obvious for those skilled in the art that the invention is not so limited.

This invention is declared to cover all changes and modifications of the specific examples and embodiments of the invention herein disclosed for purposes of illustration which does not constitute a departure from the spirit and scope of the invention.

The embodiments of the invention in which an exclusive property or privilege is claimed are defined as follows:

1. A hydraulic liquid pressure sensor for use in a gas operated liquid pressure sensing system, comprising:
   (a) a rigid sensor body having thereon a generally circular and substantially flat membrane resting surface, a gas inlet communicating to a peripheral portion of said resting surface and a gas outlet having an opening in said resting surface in a centrally disposed location on said generally circular resting surface,
   (b) a flexible membrane member positioned adjacent to said resting surface and resting in flush contact therewith when in an undistorted collapsed state in the absence of gas flow between said inlet and said outlet, and
   (c) means for securing and sealing said flexible membrane to said resting surface around the periphery of said generally circular membrane resting surface at a location radially outward of said gas inlet in order to render said membrane responsive to gas flow along a path from said inlet between said resting surface and said membrane to said outlet and influenced by hydraulic liquid pressure acting on the side of said membrane opposite said resting surface, and
   (d) said inlet has a generally annular inlet groove in said body opening to said resting surface and spaced substantially outward of, and in a generally concentric relation to said outlet opening in order to form a fluid passageway from between said resting surface and said membrane, and said gas inlet additionally includes another groove in said sensor body opening to said resting surface, connected to said generally annular inlet groove and extend inward therefrom relative to the center portion of said resting surface on said circular resting surface and not connected to said outlet opening.

2. The pressure sensor of claim 1, wherein said gas inlet additionally includes a plurality of other inlet grooves in said sensor body opening to said resting surface, connected to one end to said generally annular inlet groove and extending therefrom inwardly on said resting surface and terminating in a spaced relation to said outlet opening.

3. The pressure sensor of claim 2, wherein said plurality of other inlet grooves includes a plurality of grooves radially disposed over said resting surface, with each groove connected to said annular inlet groove on their outer end and having their inner end terminating in a substantially uniform and spaced relation to said outlet opening.

4. The pressure sensor of claim 1 having a quantity of eight of said other inlet grooves being substantially straight and located in a regularly spaced relation to one another and extending from said annular inlet groove toward said outlet opening.

5. The pressure sensor of claim 1, wherein said outlet opening has an annular groove in said sensor body opening to said circular resting surface, located in concentric relation to the center of said circular resting surface and spaced radially inward of the inner end of said other inlet groove.

6. The pressure sensor of claim 5, wherein said gas inlet has a plurality of inlet grooves radially disposed over said resting surface with each groove connected to said annular inlet groove and having their inner ends terminating in a spaced relation to said annular outlet opening.

7. The pressure sensor of claim 1, wherein said sensor body has a generally cylindrically exterior terminating on a bottom side at said generally circular resting surface and having on its upper side separate fluid connection means for fluid communication with said gas inlet and said gas outlet.

8. The pressure sensor of claim 1, wherein said means for securing and sealing said flexible membrane is a bonding material located around an annular outer peripheral portion of said resting surface and securing an outer peripheral portion of said membrane thereto.

9. The pressure sensor of claim 8, wherein said sensor body has a second annular groove in said resting surface between said annular inlet groove and said means securing and sealing said flexible membrane to said resting surface, said second annular groove operably forming a reservoir to collect excess bonding material and a limit to the inward extent of bonding between said membrane and said sensor body resting surface.

10. The pressure sensor of claim 9, wherein said sensor body is mounted within a protective outer body member and said outer body member has means to be mounted to a supporting structure for use and operation of the pressure sensor.

11. The pressure sensor of claim 1, wherein said sensor body and said flexible membrane are chosen from materials that have substantially similar linear coefficients of expansion with respect to temperature.

12. A system for measuring the level of liquid in a container comprising:
(a) a liquid pressure sensor mounted in a container of liquid and located at a predetermined distance above the bottom of said container, said pressure sensor has a rigid sensor body with a generally circular membrane resting surface thereon, a gas inlet communicating to a peripheral annular segment of said resting surface and a gas outlet having an opening in said resting surface and communicating from a centrally disposed location on said generally circular resting surface, said inlet has a generally annular inlet groove in said body opening to said resting surface and spaced substantially outward of, and in a generally concentric relation to said outlet opening in order to form a fluid passageway from between said resting surface and said membrane and said gas inlet additionally includes another groove in said sensor body opening to said resting surface, connected to said generally annular inlet groove and extend inward therefrom relative to the center portion of said resting surface on said circular resting surface and not connected to said outlet opening, a flexible membrane member positioned on said resting surface and being in flush contact therewith in an undistorted state in the absence of gas flow between said inlet and said outlet, and means securing and sealing said flexible membrane to said resting surface around the periphery of said generally circular resting surface to make said membrane responsive to gas flow from said inlet to said outlet in passing between said resting surface and said membrane as influenced by hydraulic liquid pressure acting on the side of said membrane opposite said resting surface,
(b) a gas source having a constant flow rate output connected to a gas flow pressure monitor and to said pressure sensor inlet, and
(c) a vent conduit connected to said pressure sensor outlet on one end thereof and in fluid communication with the atmosphere on its other end.

13. The system of claim 12, wherein:
(a) said generally circular resting surface is substantially flat,
(b) said membrane is bonded around the annular periphery of one side thereof to said generally circular resting surface,
(c) said pressure sensor body is mounted within a protective outer body and said outer body has means to be mounted to a supporting structure in said container; and
(d) said system has said pressure sensors mounted in a drilling fluid container in order to measure the level of drilling fluid in the container.

14. A system for measuring the density of drilling fluid in a container, comprising
(a) a liquid pressure sensor mounted in a container of liquid and located at a predetermined distance above the bottom of said container, said pressure sensor has a rigid sensor body with a generally circular membrane resting surface thereon, a gas inlet communicating to a peripheral annular segment of said resting surface and a gas outlet having an opening in said resting surface and communicating from a centrally disposed location on said generally circular resting surface, said inlet has a generally annular inlet groove in said body opening to said restng surface and spaced substantially outward of, and in a generally concentric relation to said outlet opening in order to form a fluid passageway from between said resting surface and said membrane and said gas inlet additionally includes another groove in said sensor body opening to said resting surface, connected to said generally annular inlet groove and extend inward therefrom relative to the center portion of said resting surface on said circular resting surface and not connected to said outlet opening, a flexible membrane member positioned on said resting surface and being in flush contact therewith in an undistorted state in the absence of gas flow between said inlet and said outlet, and means securing and sealing said flexible membrane to said resting surface around the periphery of said generally circular resting surface to make said membrane responsive to gas flow from said inlet to said outlet in passing between said resting surface and said membrane as influenced by hydraulic liquid pressure acting on the side of said membrane opposite said resting surface, (b) a second liquid pressure sensor similar to said first named pressure sensor and also mounted in said container at a known elevation above that of said first named pressure sensor, (c) a first constant flow rate gas source connected to the inlet of said first pressure sensor, (d) a separate second constant flow rate gas source connected to the inlet of said second pressure sensor, (e) a conduit communicably connecting the outlet of said first pressure sensor to the outlet of said second pressure sensor and to an inlet of an outlet gas pressure buffering device, (f) said outlet gas pressure buffering device has a gas pressure regulating means operably connected between an inlet and an outlet thereof and being operable to regulate incoming pressure at a value above atmospheric pressure, and (g) a vent conduit connected to said outlet pressure buffering device outlet and in open fluid communication with the atmosphere.

15. The system of claim 14, wherein said first and said second pressure sensors each have, (a) said generally circular resting surface substantially flat, and (b) said membrane bonded around the annular periphery of one side thereof to the facing side of said generally circular resting surface.

* * * * *